April 2, 1957     R. C. BURGGREN     2,787,678
ACCELERATION RESPONSIVE DEVICE
Filed Sept. 22, 1954
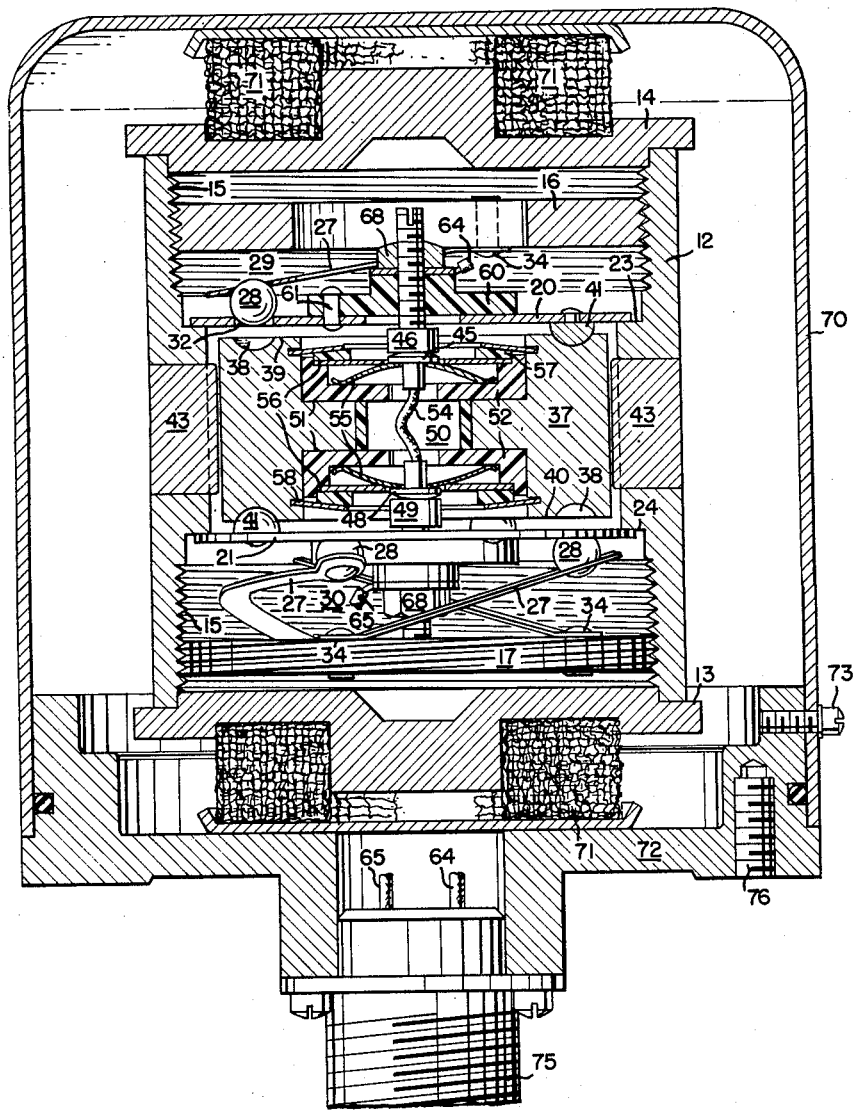
INVENTOR.
ROBERT C. BURGGREN
BY *George H Fisher*

2,787,678

ACCELERATION RESPONSIVE DEVICE

Robert C. Burggren, Minneapolis, Minn., assignor to Minneapolis-Honeywell Regulator Company, Minneapolis, Minn., a corporation of Delaware Application September 22, 1954, Serial No. 457,598

6 Claims. (Cl. 200—61.53)

This invention pertains to accelerometers and particularly to acceleration responsive switches.

It is well known to the art that aircraft are designed to operate within certain stress limits and that one of the main reasons aircraft are sometimes stressed beyond these limits are the forces on the aircraft due to excessive accelerations. The amount of acceleration that can be safely withstood varies with the direction of acceleration. My invention concerns an acceleration responsive switch in which the control point setting of the switch can be independently adjusted for two different directions of acceleration. Therefore if an aircraft is designed to withstand 5 G's acceleration vertically upward and only two G's vertically downward, the acceleration responsive switch of my invention can be adjusted to give a signal when either of these two points are reached. Obviously, my switch can be used in conjunction with a control means to prevent the aircraft from exceeding these limits of acceleration.

Therefore, an object of my invention is to provide a switch that is responsive to acceleration. Another object of my invention is to provide a switch that is independently responsive to acceleration in opposite directions. Yet another object of my invention is to provide a means for adjusting the point of response to acceleration independently for each of opposite directions.

Further objects of my invention will become evident from the following drawing, specifications and claims in which the drawing is a cross-sectional elevation of my device.

An inner fitted casing 12 is cylindrical in shape and has plates 13 and 14 fitted at its ends. The inner surface of casing 12 is threaded as shown at 15 at each end. Circular adjusting plates 16 and 17 are threaded at their periphery and engage the threads 15 in the casing 12. Members 20 and 21 are disposed in casing 12 so as to normally engage annular abutments 23 and 24 on the inner surface of casing 12.

A plurality of helical leaf springs 27 and balls 28 form a first spring means 29 between adjusting plate 16 and the member 20 and form a separate spring means 30 between adjusting plate 17 and the member 21. Balls 28 rest in suitable recesses 32 in members 20 and 21. One end of each helical leaf spring has an opening that holds a ball 28, while the other end of each helical leaf spring 27 is riveted to circular adjusting plates 16 and 17 by rivets 34. Spring means 29 and 30 normally bias members 20 and 21 against abutments 23 and 24 respectively in casing 12, and also serve to guide members 20 and 21 for axial movement. Spring means 29 and 30 are adjustable by turning circular adjusting plates 16 and 17 in casing 12 to provide independent determination of the force required to separate member 20 from abutment 23 and to separate member 21 from abutment 24.

A mass 37 is disposed in casing 12 intermediate members 20 and 21 and has annular grooves 38 formed in end 39 and 40. The annular grooves 38 normally engage a plurality of hemispherical abutments 41 on members 20 and 21 to center the mass 37 in the casing 12 and, through spring means 29 and 30, to guide the mass for axial movement therein. A plurality of guide members 43 normally are out of engagement with mass 37 but serve to guide mass 37 back to its normal axial position if displaced therefrom by transient horizontal accelerations.

A contact 45 on mass 37 normally engages contact 46 on member 20 and a contact 48 on mass 37 normally engages a contact 49 on member 21. A centrally disposed opening 50 in mass 37 has annular abutments 51 to seat insulating members 52. The insulating members 52 have a hole at the center to permit electrical interconnection of contacts 45 and 48 by a conductor 54. Contacts 45 and 48 are carried by spring members 55 which bias the contacts 45 and 48 outward. Spring members 55 rest on insulating members 52 and are held in position by plates 56 which have holes at their centers to allow contacts 45 and 48 to extend therethrough. Plates 56 are held in place by insulating rings 57 and snap rings 58. The contacts 45 and 48 cooperate with the contacts 46 and 49 which are carried by insulating members 60 riveted to members 20 and 21 by rivets 61. Electrical conductors 64 and 65 are attached to the contacts 46 and 49 by nuts 68.

The casing 12 is supported in an outer casing 70 by resilient vibration absorbing members 71. Casing 70 is carried by a base plate 72 and attached thereto by a plurality of screws 73. The electrical connectors 64 and 65 are attached to a standard connector 75 which is carried by base plate 72. Suitable holes not shown are provided for passage of electrical connectors 64 and 65 from connector 75 to contacts 46 and 49. There are a plurality of threaded holes 76 in base plate 72 for mounting the device e. g. on an airplane.

On upward vertical acceleration mass 37 will tend to resist such movement and when acceleration is great enough to create a force downward through mass 37 to overcome the bias of spring means 30 the contacts 45 and 46 will separate breaking the circuit normally closed between 64 and 65. Likewise when vertical acceleration downward is great enough to create a force upward through mass 37 to overcome the bias of spring means 29 the contacts 48 and 49 will separate breaking the circuit normally closed between 64 and 65. The acceleration at which the circuit is broken can be independently adjusted for both up and down acceleration by changing the position of adjusting plates 16 or 17. A sealed joint between casing 14 and end plates 12 would allow the casing to be filled with a suitable liquid for damping vibration of the mass 37.

It will be understood that the foregoing structure described is representative of only one embodiment of my invention and that various changes in modifications may readily occur to those skilled in the art without departing from the spirit and scope thereof.

Having now fully described my invention, what I claim is:

1. An acceleration responsive device comprising, a casing screw threaded on the inner surface at each end, first and second circular adjusting plates screw threaded and cooperating with said screw threads on the inner surface of said casing, first and second members disposed in said casing and each normally engaging an abutment disposed toward opposite ends of said casing, a plurality of helical leaf springs comprising first and second spring means each of said spring means acting between one of said circular adjusting plates and an associated member and biasing said member into engagement with the associated abutment on said casing, said first and second spring means axially guiding said members for axial movement, each of said spring means being adjustable by one of said circular adjusting plates to determine independently the force required to separate the associated member from its abutment, a mass intermediate said members with annular grooves on opposite faces normally engaging a plurality of abutments on both of said members, and control means actuated by displacement of said mass from said normal position.

2. An acceleration responsive switch comprising, a casing, first and second members disposed in said casing each normally engaging an abutment on said casing, first and second spring means each acting between said casing and one of said members and biasing said member into engagement with the associated abutment on said casing, each of said spring means being adjustable to determine independently the force required to separate the associated member from its abutment, a mass intermediate said members normally engaging both of said members, cooperating electrical contacts on said mass and each of said members, and an electrical connection between contacts on opposite sides of said mass completing a circuit between the contacts of said first and second members when said mass is in said normal position.

3. An acceleration responsive switch comprising, a casing, a member disposed in said casing and normally engaging an abutment on said casing, a spring means acting between said casing and said member and biasing said member into engagement with said abutment on said casing, said spring means being adjustable to determine the force required to separate said member from said abutment, a first contact at the opposite end of said casing from said member, a mass intermediate said first member and said first contact and a second contact on said mass normally engaging said first contact and completing an electrical circuit, said contacts being separated upon movement of said mass against the force of said spring means.

4. An acceleration responsive switch comprising a casing, first and second members disposed in said casing and each normally engaging an abutment on said casing, first and second spring means each acting between said casing and one of said members and biasing said member into engagement with its associated abutment on said casing, each of said spring means being adjustable to determine independently the force required to separate the associated member from its abutment, a mass intermediate said members normally engaging both of said members, cooperating electrical contacts carried by and insulated from said mass and each of said members, third and fourth spring means normally biasing said contacts on opposite ends of said mass outward, and an electrical connection between contacts on opposite ends of said mass normally completing a circuit between the contacts of said first and second members when said mass is in said normal position.

5. An acceleration responsive switch comprising, a casing screw threaded on the inner surface of each end, first and second circular adjusting plates screw threaded and cooperating with said screw threads on the inner surface of said casing, first and second members disposed in said casing and each normally engaging an abutment on said casing, first and second spring means each acting between one of said circular adjusting plates and one of said members and biasing said member into engagement with the associated abutment on said casing, each of said spring means being adjustable by one of said circular adjusting plates to determine independently the force required to separate the associated member from its abutment, a mass intermediate said members normally engaging both of said members, cooperating electrical contacts carried by said mass and each of said members, and an electrical connection between contacts on opposite ends of said mass completing a circuit between the contacts of said first and second members when said mass is in said normal position.

6. An acceleration responsive device comprising, a casing, first and second members disposed in said casing each normally engaging an abutment on said casing, first and second spring means each acting between said casing and one of said members and biasing said member into engagement with associated abutment on said casing, each of said spring means being adjustable to determine independently the force required to separate the associated member from its abutment, a mass intermediate said members normally engaging both of said members, and control means actuated by displacement of said mass from said normal position.

References Cited in the file of this patent
UNITED STATES PATENTS

| 1,845,848 | Richards | Feb. 16, 1932 |
| 2,683,001 | MacIntyre | July 6, 1954 |